US006538447B2

(12) United States Patent
Bittar

(10) Patent No.: US 6,538,447 B2
(45) Date of Patent: Mar. 25, 2003

(54) COMPENSATED MULTI-MODE ELCTROMAGNETIC WAVE RESISTIVITY TOOL

(75) Inventor: Michael S. Bittar, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 5 days.

(21) Appl. No.: 09/736,542

(22) Filed: Dec. 13, 2000

(65) Prior Publication Data

US 2002/0101242 A1 Aug. 1, 2002

(51) Int. Cl.$^7$ .............................. G01V 3/18; G01V 3/30
(52) U.S. Cl. ........................................ 324/338; 324/339
(58) Field of Search ................................ 324/338, 339, 324/340, 341, 342, 343, 334, 335

(56) References Cited

U.S. PATENT DOCUMENTS

| | | | |
|---|---|---|---|
| 4,968,940 A | 11/1990 | Clark et al. ................. | 324/338 |
| 5,235,285 A | 8/1993 | Clark et al. ................. | 324/342 |
| 5,278,507 A | 1/1994 | Bartel et al. ................ | 324/338 |
| 5,428,293 A | 6/1995 | Sinclair et al. ............. | 324/339 |
| 5,594,343 A * | 1/1997 | Clark et al. ................. | 324/338 |
| 6,184,685 B1 * | 2/2001 | Paulk et al. ................. | 324/338 |
| 6,218,842 B1 | 4/2001 | Bittar et al. ................ | 324/339 |

OTHER PUBLICATIONS

Bittar, M.S. Rodney, P.F., Hendricks, W.E., *Invasion Profiling With a Multiple Depth of Investigation Electromagnetic Wave Resistivity Sensor*, Society of Petroleum Engineers (SPE) 28425 (1994).

Bittar, M.S., Rodney, P.F., Mack, S.G., Bartel, R.P., *A True Multiple Depth of Investigation Electromagnetic Wave Resistivity Sensor: Theory, Experiment and Prototype Field Test Results*, Society of Petroleum Engineers (SPE) 22705 (1991).

Ball, S., and Hendricks, W.E., *Formation Evaluation Utilizing a New MWD Multiple Depth of Investigation Resistivity Sensor*, Fifteenth European Formation Evaluation Symposium (May 5–7, 1993).

Sperry–Sun Drilling Services, *MWD Tool Accurately Measures Four Resistivities*, a reprint from Oil & Gas Journal, week of May 25, 1992.

* cited by examiner

*Primary Examiner*—Walter E. Snow
(74) *Attorney, Agent, or Firm*—Conley Rose, P.C.

(57) ABSTRACT

A multi-mode resistivity tool for use in a logging-while-drilling (LWD) system includes an asymmetric transmitter design with multiple transmitters capable of generating electromagnetic (EM) signals at multiple depths of investigation. An array of at least three receivers is positioned amongst a transmitter array to detect the EM signals after they have traversed the region in the vicinity of the borehole. In a first mode, two pairs of receivers combine with the asymmetrical transmitter array to produce a plurality of compensated resistivity measurements. In an alternative mode, one pair of receivers, consisting of a receiver from each of the previous pairs, combines with the array of transmitters to create a plurality of non-compensated measurements. This multi-mode capability enables the resistivity tool to operate successfully in a wide variety of drilling formations and under a broad scope of drilling conditions.

13 Claims, 8 Drawing Sheets

Fig. 4
(Prior Art)
Fig. 5
(Prior Art)
Fig. 6
(Prior Art)
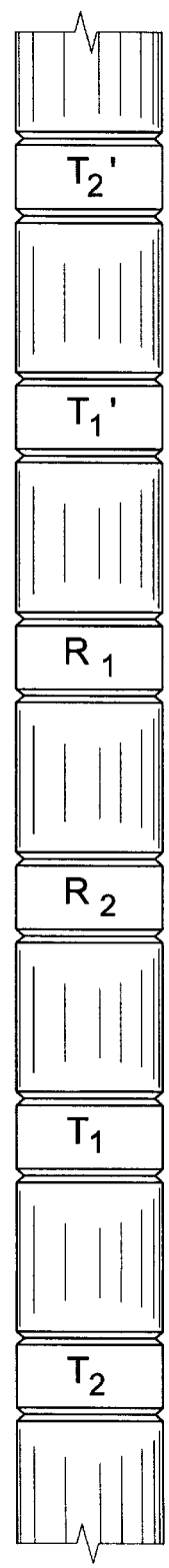
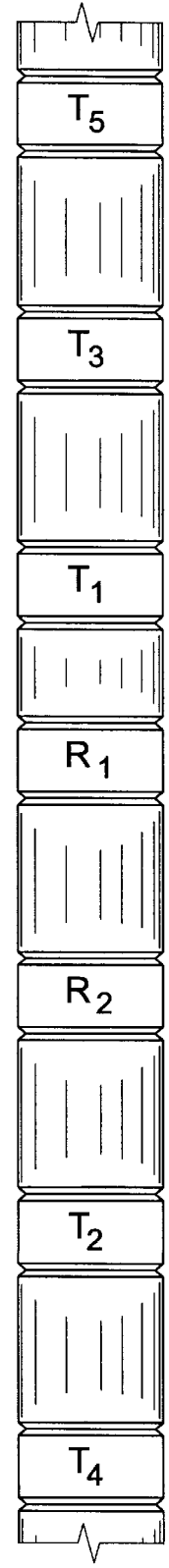

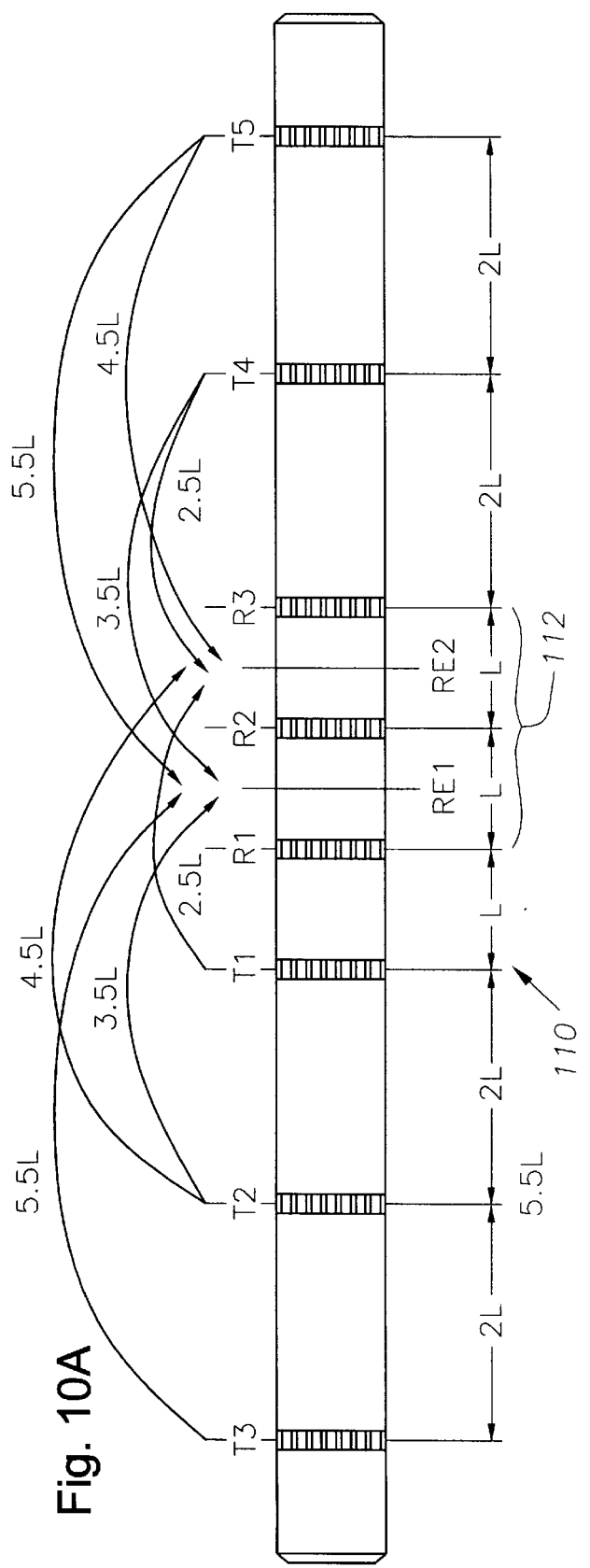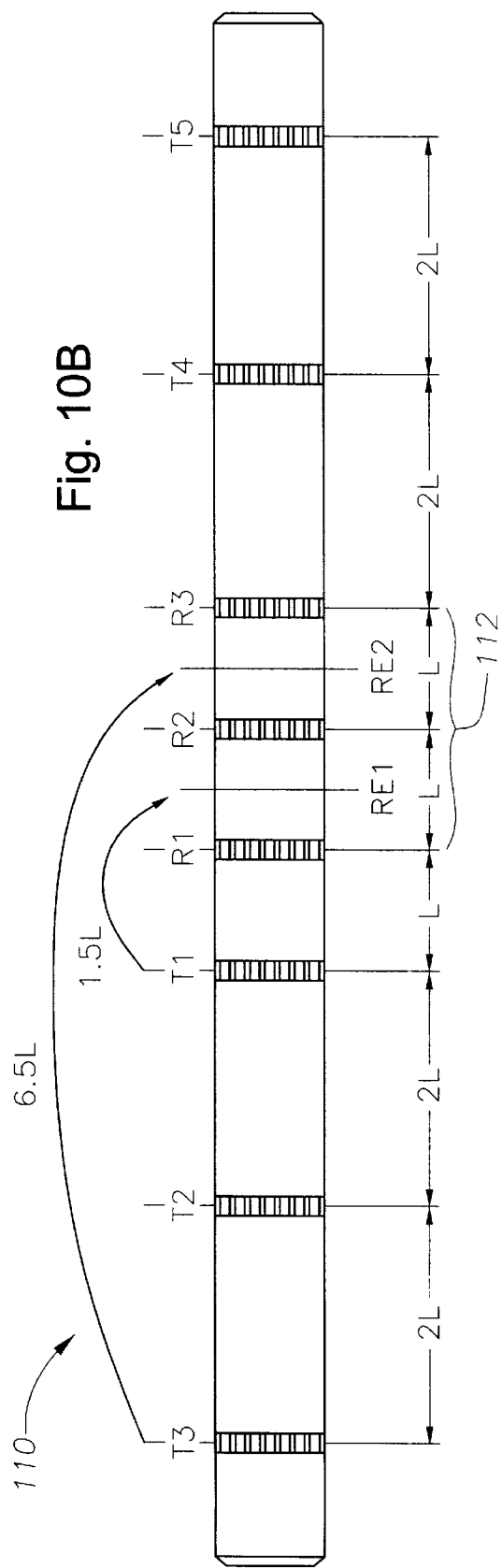

COMPENSATED MULTI-MODE ELCTROMAGNETIC WAVE RESISTIVITY TOOL

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a logging-while-drilling (LWD) tool that measures the resistivity of formations adjacent to the wellbore. More particularly, the present invention relates to an LWD resistivity tool with multiple transmitters operating in an asymmetric configuration to provide multiple depths of investigation. Still more particularly, the present invention relates to an LWD resistivity tool that includes a unique arrangement of transmitters and receivers that enable compensated resistivity measurements to be made during drilling operations.

2. Background of the Invention

Wells are drilled to reach and recover petroleum and other hydrocarbons in subterranean formations. Modem drilling operations demand a great quantity of information relating to the parameters and conditions encountered downhole to permit the driller to change the direction of drilling to find or stay in formations that include sufficient quantities of hydrocarbons. Such information typically includes characteristics of the earth formations traversed by the wellbore, in addition to data relating to the size and configuration of the borehole itself. The collection of information relating to conditions downhole, which commonly is referred to as "logging," can be performed by several methods.

Wireline logging has been known in the industry for many years as a technique for providing information regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors electrical equipment located at the surface of the well. Normally, the cable supplies operating power to the sonde. Further, the cable is used as an electrical conductor to transmit information signals from the sonde to the surface, and control signals from the surface to the sonde. In accordance with conventional techniques, various parameters of the earth's formations are measured and correlated with the position of the sonde in the borehole as the sonde is pulled uphole.

While wireline logging is useful in assimilating information relating to formations downhole, it nonetheless has certain disadvantages. For example, before the wireline logging tool can be run in the wellbore, the drillstring and bottom hole assembly first must be removed or "tripped" from the borehole, resulting in considerable cost and loss of drilling time for the driller (who typically is paying daily fees for the rental of drilling equipment). In addition, because wireline tools are unable to collect data during the actual drilling operation, the drilling service company must at times make decisions (such as the direction to drill, etc.) possibly without sufficient information, or else incur the cost of tripping the drillstring to run a logging tool to gather more information relating to conditions downhole. In addition, because wireline logging occurs a relatively long period after the wellbore is drilled, the accuracy of the wireline measurement can be compromised. As one skilled in the art will understand, the wellbore conditions tend to degrade as drilling fluids invade the formation in the vicinity of the wellbore. Consequently, a resistivity tool run one or more days after a borehole section has been drilled may produce measurements that are influenced by the resistivity of the mud that has invaded the formation. In addition, the shape of the borehole may begin to degrade, reducing the accuracy of the measurements. Thus, generally, the sooner the formation conditions can be measured, the more accurate the reading is likely to be. Moreover, in certain wells such as horizontal wells, wireline tools cannot run.

Because of these limitations associated with wireline logging, there is an increasing emphasis on developing tools that can collect data during the drilling process itself. By collecting and processing data and transmitting it to the surface real-time while drilling the well, the driller can more accurately analyze the surrounding formation, and also can make modifications or corrections as necessary to optimize drilling performance. With a steerable system the driller may change the direction in which the drill bit is headed. By detecting the adjacent bed boundaries, adjustments can be made to keep the drill bit in an oil bearing layer or region. Moreover, the measurement of formation parameters during drilling, and hopefully before invasion of the formation, increases the usefulness of the measured data. Further, making formation and borehole measurements during drilling can save the additional rig time which otherwise would be required to run a wireline logging tool.

Designs for measuring conditions downhole and the movement and the location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used generically with the understanding that the term encompasses systems that collect formation parameter information either alone or in combination with the collection of information relating to the position of the drilling assembly.

Typically, LWD measurements are used to provide information regarding the particular formation through which the borehole crosses. For a formation to contain hydrocarbons and permit the hydrocarbons to flow through it, the rock comprising the formation must have certain well known physical characteristics. One characteristic is that the formation has a certain measurable resistivity (the inverse of conductivity), which can be determined by an electromagnetic wave that travels through the formation. As will be apparent to one skilled in the art, a wave traveling from point A to point B is attenuated and its phase is shifted proportionally to the conductivity of the media in which it travels. Resistivity tools transmit such EM waves and measure the attenuation and phase shift.

Analysis of this attenuation and phase shift provides the resistivity of the formation surrounding the resistivity tool, which then can be used in combination with other measurements to predict whether the formation will produce hydrocarbons. A sudden measured change in resistivity at the boundary between beds of shale and sandstone can be used to locate these boundaries. In horizontal drilling, the drill bit preferably can then be steered to avoid this boundary and keep the wellbore inside the oil-producing bed. However, to accomplish this detection reliably, a great deal of data is required from the resistivity tool.

Generally speaking, it is desirable for the resistivity tool to measure at multiple depths into the formation around the borehole between the transmitter and receiver pair. Referring to FIG. 1, the first and closest zone of interest relative to the resistivity tool is the area within the wellbore through which drilling mud flows back to the surface. If the resistivity of this zone inside the wellbore is measured (around the tool itself), a resistivity value will be obtained that generally approximates the resistivity of the drilling mud, $R_m$. The next zone of interest is the region within the surrounding formation that has been invaded by the drilling mud. The diameter of this zone of interest can be referred to as $D_i$. A resistivity measurement in this region will produce a resistivity value of approximately $R_{xo}$, which is the resistivity of the invaded zone. The third zone of interest is the formation which has not been invaded by drilling mud. A resistivity measurement of this region will yield the true resistivity value of the formation, $R_t$. As one skilled in the art will understand, the diameters, $D_m$ and $D_i$ will vary depending upon many factors, including the characteristics of the formation and the drilling mud, the time that has elapsed from when that portion of the wellbore was drilled, and the like.

To measure resistivity in the various zones of interest, resistivity tools are preferably designed with a plurality of depths of investigation. These depths of investigation preferably extend to a wide variety of diameters so that a full array of measurements will contain resistivity information for all or most of the formation zones of interest. While information regarding $R_m$ and $R_{xo}$ are useful for purposes of evaluation, one of the goals of the resistivity tool is to measure the true formation resistivity, $R_t$. Thus, it is important to design the resistivity tool to have a sufficient depths of investigation to measure this resistivity. Furthermore, it should be noted that measurements for deeper depths of investigation are influenced by the resistivity of all included ones, thus some processing of formation resistivity data will be necessary.

For a given frequency and borehole configuration, the depth of investigation is determined by the transmitter-receiver spacing. Multiple depths of investigation may therefore be achieved by providing multiple transmitter-receiver spacings. Additional depths of investigation may further be achieved by using multiple frequencies. Even then, the tools having a greater number of transmitter-receiver spacings are generally considered more desirable.

Resistivity tools have undergone a substantial evolution in order to obtain more resistivity data. FIG. 2 shows a prior art resistivity tool that forms part of a bottom hole assembly. Above the bottom hole assembly, a drill string couples the bottom hole assembly to the structure at the surface of the well. The bottom hole assembly includes a drill bit that drills into the formation. A sensor sub is positioned at some location above the bit, and measures various information regarding the formation and the position of the bottom hole assembly. The sensor sub typically includes a resistivity tool capable of measuring the resistivity in the region around the borehole. The resistivity tool includes a transmitting loop antenna $T_x$ that transmits electromagnetic signals into the formation. The resistivity tool also includes a pair of loop antennas, $R_1$ and $R_2$, positioned a predetermined distance from the transmitter. Transmitter $T_x$ generates an electromagnetic (EM) wave at a selected frequency that is received at receivers $R_1$ and $R_2$ after traveling through the formation.

The placement of the transmitters with respect to the receiver, and the frequency selected for the EM wave depends on certain criteria. On the one hand, as the transmitter T is placed further away from the receiver pair $R_1$ and $R_2$, the attenuation of the transmitted wave becomes more severe. To compensate, the transmitter may use more power to generate a stronger signal that can be detected by the receiver pair. Because lower frequency signals attenuate more slowly than do high frequency signals, use of lower frequency signals can also reduce the attenuation of the signal. Unfortunately, lower frequency signals provide less resolution regarding the formation bed boundaries than do high frequency signals. Yet another consideration is that lower frequency signals tend to propagate further into the formation, thus providing a potentially greater depth of investigation for the resistivity measurement. On the other hand, as the transmitter $T_x$ is placed closer to the receiver pair, $R_1$ and $R_2$, phase shift and attenuation become harder to detect. A higher frequency signal makes this detection easier. Thus, generally, lower frequency signals tend to be preferred as the distance between the transmitter and receiver pair increases, and higher frequency signals tend to be preferred as the distance decreases between the transmitter and the receiver pair.

The signals detected at the two receivers, $R_1$ and $R_2$, will of course differ because the distance between $R_2$ and transmitter $T_x$ is greater than the distance between $R_1$ and transmitter $T_x$. As one skilled in the art will understand, the ratio of the voltage received at $R_1$ and $R_2$ thus can be used to establish the attenuation ratio and phase shift difference of the transmitted EM wave that traveled through the formation of interest. This effectively produces a measurement at the point in the middle of the two receivers, shown on FIG. 2 as $R_e$. Based upon the attenuation and phase shift measurements, an estimate of the resistivity can be made.

Improvements to this relatively simplistic design have been made over the years to produce more data regarding the formation, and to improve the quality of the data that is derived. For example, FIG. 3 shows a prior art resistivity tool with three transmitters $T_1$, $T_2$, and $T_3$, in addition to a pair of receivers, $R_1$ and $R_2$. The inclusion of two additional transmitters provides more resistivity data. Because of the different spacing of the transmitters with respect to the receivers, the signals generated by each of the transmitters traverses a different path to the receiver pair. The signal transmitted by the transmitter furthest from the receiver pair tends to travel more deeply into the formation. Thus, the different transmitters produce different depths of investigation of the formation. The transmitters are activated in a multiplexing fashion, so that each transmitter individually fires, thereby permitting the receivers to identify which transmitter is the source of the electromagnetic (EM) signal. Thus, during operation, a single transmitter fires, such as transmitter $T_1$, sending an EM wave at a particular frequency into the formation. The wave is then received at receivers $R_1$ and $R_2$, and an attenuation and phase shift measurement can be determined for that transmitter. Transmitter $T_2$ then fires at the same frequency, and an attenuation and phase shift is measured for that transmitter. Finally, transmitter $T_3$ fires, and an attenuation and phase shift measurement is made with respect to that transmitter. Each firing results in readings at the two receivers, $R_1$ and $R_2$. Multiple readings at the receivers result in multiple measurements of phase shift and attenuation of the signals. Consequently, a more accurate resistivity profile can be obtained, with multiple depths of investigation.

FIG. 4 shows a prior art resistivity tool with four transmitters $T_1$, $T_2$, $T_3$, and $T_4$ in addition to a pair of receivers, $R_1$ and $R_2$. See M. S. Bittar, et al., "A True Multiple Depth of Investigation Electromagnetic Wave Resistivity Sensor: Theory, Experiment and Prototype Field Test Results," presented at the 66$^{th}$ Annual Technical Conference and Exhibition of the Society of Petroleum Engineers on Oct. 6–9, 1991; S. Ball, et al., "Formation Evaluation Utilizing a New MWD Multiple Depth of Investigation Resistivity Sensor," presented at the Fifteenth European Formation Evaluation Symposium on May 5–7, 1993. As noted above, the greater the distance between a transmitter and a pair of receivers, the greater the depth of investigation into the formation. Thus, the addition of a fourth and a fifth transmitter results in more data being received at the receivers, and a more accurate profile of resistivity around the well bore. As with the resistivity tool shown in FIG. 3, each transmitter fires sequentially, with attenuation and phase shift measurements being made based on the amplitude and time of the signals received by the receiver pair. Because transmitter $T_4$ is located further away from the pair of receivers, $R_1$ and $R_2$, it has been found advantageous to fire this transmitter at a lower frequency than the other transmitters $T_1$, $T_2$, $T_3$. A lower frequency signal from the transmitter traverses further (or deeper) into the formation than a comparable higher frequency signal, but results in lower vertical resolution. This lower resolution can be a problem, for example, when attempting to recognize the presence of a thin bed. Thus, it is advantageous in this design to utilize two different frequencies for the four transmitters (one frequency for $T_1$, $T_2$, $T_3$, and a lower frequency for $T_4$). Moreover, the smaller the distance between a transmitter and a pair of receivers, the less the depth of investigation into the formation. Thus, the addition of a fifth transmitter results in more data being received at the receivers, and a more accurate profile of resistivity around the well bore.

One of the problems with using the resistivity tool designs shown in FIGS. 2, 3 and 4 is that the measurements derived by the receivers will include some error components. Some of that error is attributable to the manner in which the receiver circuitry will react in response to the elevated temperatures encountered downhole. The high temperatures and other environmental obstacles encountered downhole can cause thermal drift of the electronics in the receivers. As one skilled in the art will appreciate, the high temperature affects the response of the circuitry (e.g. resistors, capacitors) in the resistivity tool. Simply put, this means that the two receivers may produce different responses in the same formation at different operating temperatures. Consequently, each resistivity tool must be corrected for thermal drift in some manner to ensure the accuracy of the resistivity measurements. Several correction techniques have developed to address this problem with thermal drift. A more recent approach, is to configure the resistivity tool in a compensated design that includes a transmitter array on each side of the receiver pair to produce compensated receiver values. The second, more traditional, technique is to use an asymmetrical transmitter design (as shown for example in FIGS. 2–4), with stored calibration values to correct the receiver measurements for thermal drift.

FIG. 5 shows a prior art resistivity tool with such compensation. The resistivity tool in FIG. 5 includes a pair of receivers, $R_1$ and $R_2$, and four transmitters $T_1$, $T_1'$, $T_2$ and $T_2'$. Unlike the tool shown in FIG. 4, the compensated tool of FIG. 5 includes a symmetric pair of transmitters placed on both sides of the receivers, $R_1$ and $R_2$. The transmitters, $T_1$ and $T_2$, below the receivers are placed the same distance away from the receivers as the transmitters, $T_1'$ and $T_2'$, above the receivers, and thus have the same depth of investigation into the formation. The results from corresponding pairs of transmitters ($T_1/T_1'$ and $T_2/T_2$) may be combined to cancel the effects of electronic component response due to temperature variations. One problem with this arrangement, however, is that only two depths of investigation can be made because effectively only two transmitter spacings are provided. To increase the number of measurements and depths of investigation, each transmitter may be fired at two different frequencies. For example, in addition to a 2 megahertz (MHz) frequency, the transmitters of this design may fire at 400 kHz. This permits four different depths of investigation into the surrounding formation. To provide additional depths of investigation without changing transmitter frequencies, more transmitters must be added, extending the length of the tool. It is often preferable to maintain a single investigation frequency because lower frequencies, although they allow deeper depths of investigation, result in a significant loss of resolution at those deeper depths.

FIG. 6 shows a resistivity tool that attempts to provide additional measurements with "pseudo-compensation." See U.S. Pat. No. 5,594,343. The resistivity tool of FIG. 6 includes a pair of receivers, $R_1$ and $R_2$, and a set of transmitters, $T_1$, $T_2$, $T_3$, $T_4$ and $T_5$. In this design, only two transmitters, $T_2$ and $T_4$, are placed below the receiver pair, whereas there are three transmitters, $T_1$, $T_3$ and $T_5$, above the receiver pair. The location of each transmitter below the receiver pair is determined by placing each transmitter half way between the position transmitters locations that would be used for a fully compensated resistivity tool. One advantage of this design is that more depths of investigation are possible than can be performed in a fully compensated tool. At the same time, this design also achieves some level of compensation, although temperature drift calibration is still required to some extent. However, those skilled in the art still debate whether the benefits in this design outweigh the error that is introduced by having an unbalanced configuration.

As compared to these compensated or pseudo-compensated designs shown in FIGS. 5 and 6, the second correction technique is to calibrate the asymmetrical resistivity tool designs shown in FIGS. 3 and 4 to correct for thermal drift. These designs have the advantage of providing more depths of investigation, since each transmitter provides a different depth of investigation. Thus, the four transmitter design of FIG. 4, for example, measures four depths of investigation. In systems, such as those shown in FIG. 4, the receivers are calibrated to determine the thermal drift of the receivers before the tool is used in an LWD operation. In this calibration process, the resistivity tool is heated to various temperatures, and the receiver response is evaluated. A look-up table is then constructed in memory to identify the thermal drift of the receivers at each temperature. When the tool subsequently is used in an LWD operation, the temperature in the vicinity of the receivers is measured, and the system determines a correction thermal drift value for the measured resistivity values by accessing the calibration look-up table. While this device may overcome the problem with thermal drift, it requires that the receivers be regularly calibrated before being used in the hole. This requires a lengthy calibration process, in which the tool is heated and thermal drift is measured for a range of temperatures. In addition, it is difficult to simulate the conditions encountered in a wellbore, and thus the calibration process may not adequately reflect the actual conditions encountered by the resistivity tool downhole.

For a compensated tool similar to FIG. 5 to be capable of achieving the number of depths of investigation possible with the tool of FIG. 4, 8 transmitters (four on each side of the receiver pair) must be deployed. Such a design, with four compensated transmitter spacings, would be approximately double the length of the tool of FIG. 4 and would raise the cost of the resistivity tool significantly.

Furthermore, some drilling operators are reluctant to deploy LWD tools that incorporate too many "cut" features about their outer diameter. Because the removed material represents a weakened ultimate tensile, bending, and (most importantly) fatigue strength, drilling operators traditionally prefer LWD sensors that represent less risk of mechanical failure downhole. A resistivity tool capable of investigating a sufficient number of compensated depths in a real-time or near real-time manner without the addition of numerous extra transmitters would be highly desirable. Despite the apparent advantages that such a configuration would offer, to date no one has successfully introduced such a system.

BRIEF SUMMARY OF THE INVENTION

The problems noted above are solved in large part by a multi-mode resistivity logging tool that preferably includes three receivers and five transmitters. Such a tool is capable of making compensated resistivity measurements at four transmitter-receiver spacings. The array of three receivers is positioned amongst the transmitter array to detect the EM signals after they have traversed the region in the vicinity of the borehole. In a first mode, two pairs of receivers combine with the asymmetrical transmitter array to produce a plurality of compensated resistivity measurements. In an alternative mode, one pair of receivers, consisting of a receiver from each of the previous pairs, combines with the array of transmitters to create a plurality of non-compensated measurements. This multi-mode capability enables the resistivity tool to operate successfully in a wide variety of drilling formations and under a broad scope of drilling conditions.

These and other advantages of the present invention will become apparent on reading the detailed description of the invention in conjunction with the drawings.

BRIEF DESCRIPTION OF THE DRAWINGS

For a detailed description of the preferred embodiments of the invention, reference will now be made to the accompanying drawings in which:

FIG. 4 shows a prior art resistivity tool that includes four transmitters used in conjunction with a receiver pair and uses multiple frequencies;

FIG. 5 shows a prior art compensated resistivity tool that includes matching transmitter arrays;

FIG. 6 depicts a pseudo-compensated resistivity tool that includes unbalanced transmitter arrays on both sides of the receiver pair;

FIG. 10A is a schematic illustration of multi-mode LWD resistivity tool constructed in accordance with a preferred embodiment functioning in a three receiver mode, detailing compensated resistivity measurements;

FIG. 10B is a schematic illustration the multi-mode LWD resistivity tool of FIG. 10A functioning in a three receiver mode, detailing non-compensated resistivity measurements

NOTATION AND NOMENCLATURE

During the course of the foregoing and following description, the terms "above" and "below" are used to denote the relative position of certain components with respect to the direction of flow of the incoming drilling mud. Thus, where a term is described as above another, it is intended to mean that drilling mud flows first through the first component before flowing through the second component. As will be apparent to one skilled in the art, these and other terms are used to identify the relative position of components in the bottom hole assembly (or BHA), with respect to the distance to the surface of the well, measured along the wellbore path.

DETAILED DESCRIPTION OF THE PREFERRED EMBODIMENTS

Figure 1:
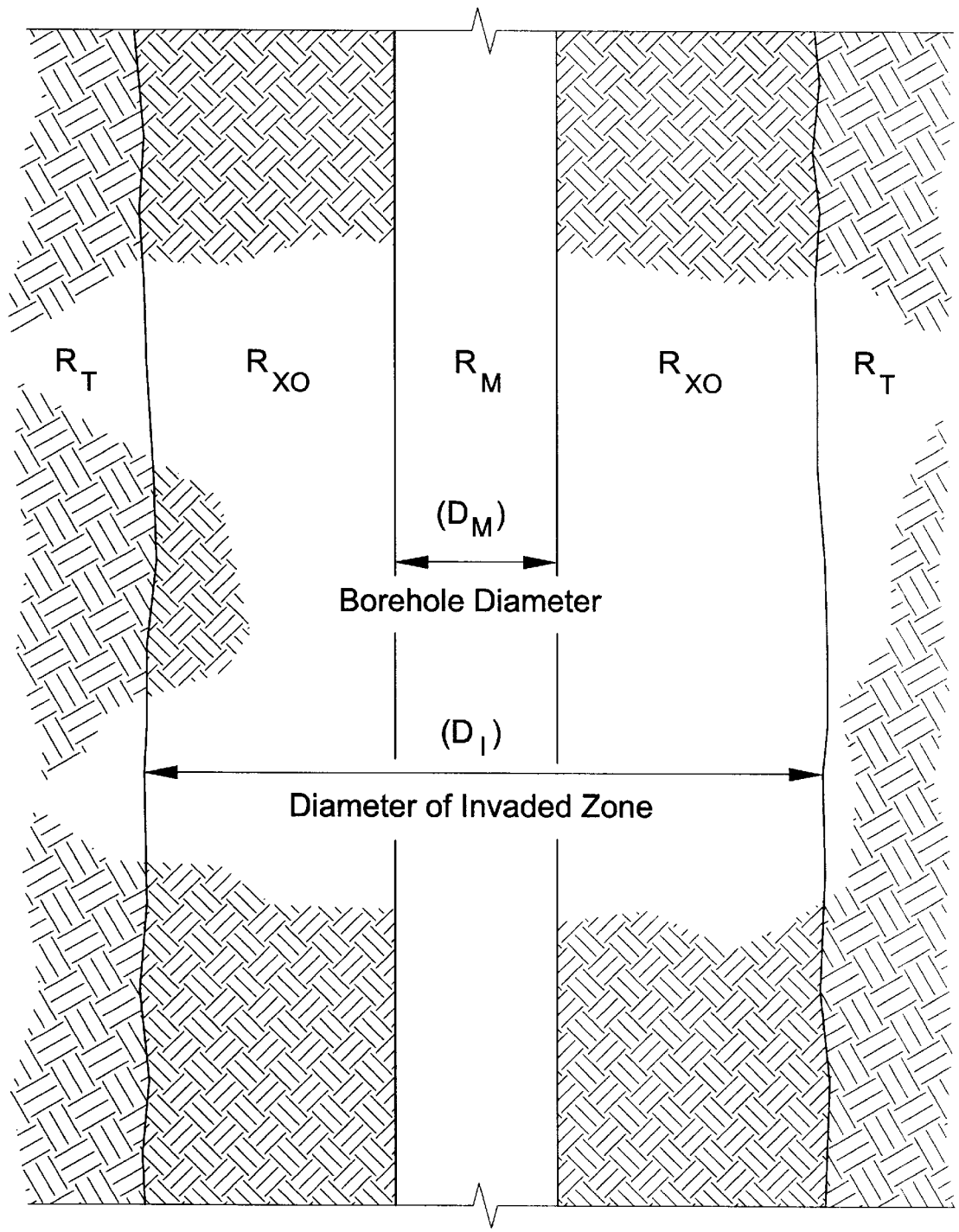
FIG. 1 illustrates the various zones of interest for which resistivity measurements are desired.
Figure 2:
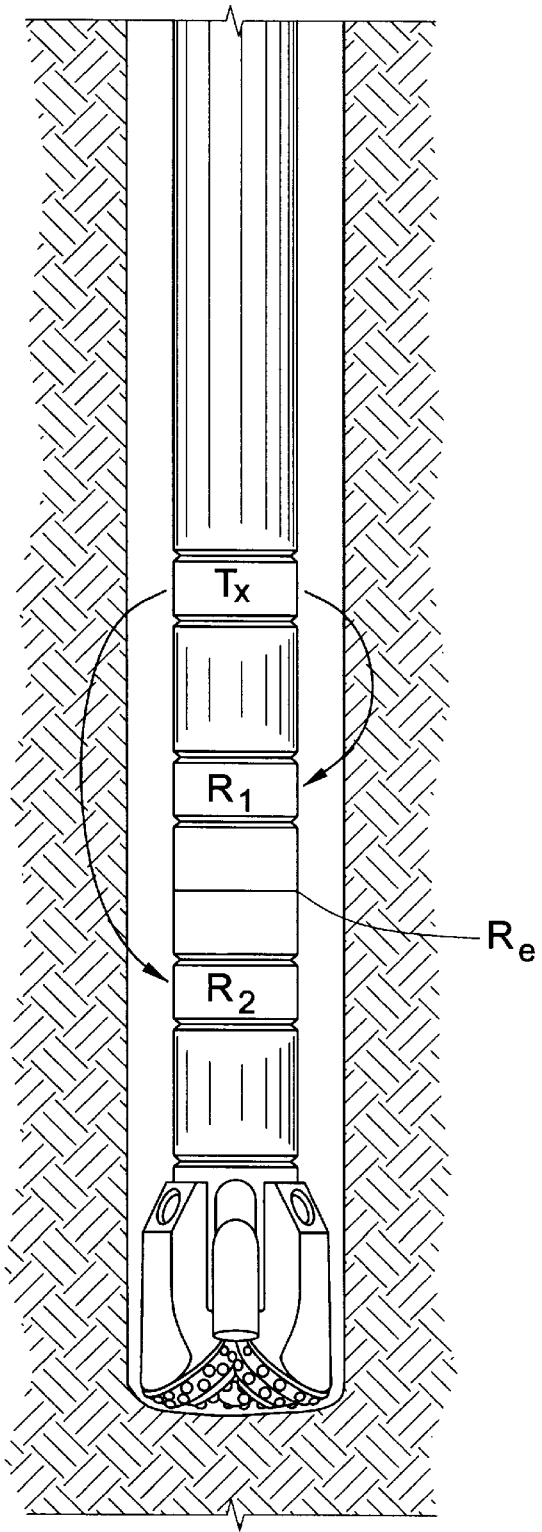
FIG. 2 shows a prior art resistivity tool with a single transmitter and a receiver pair.
Figure 3:
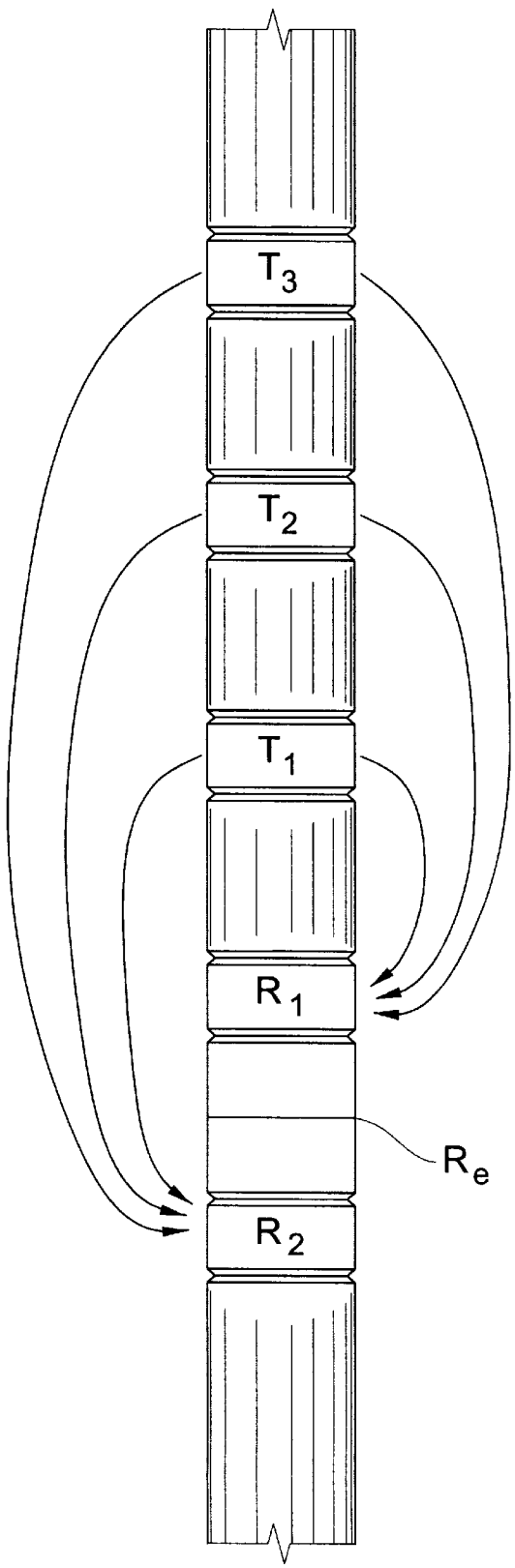
FIG. 3 shows a prior art resistivity tool that includes three transmitters used in conjunction with a receiver pair.
Figure 7:
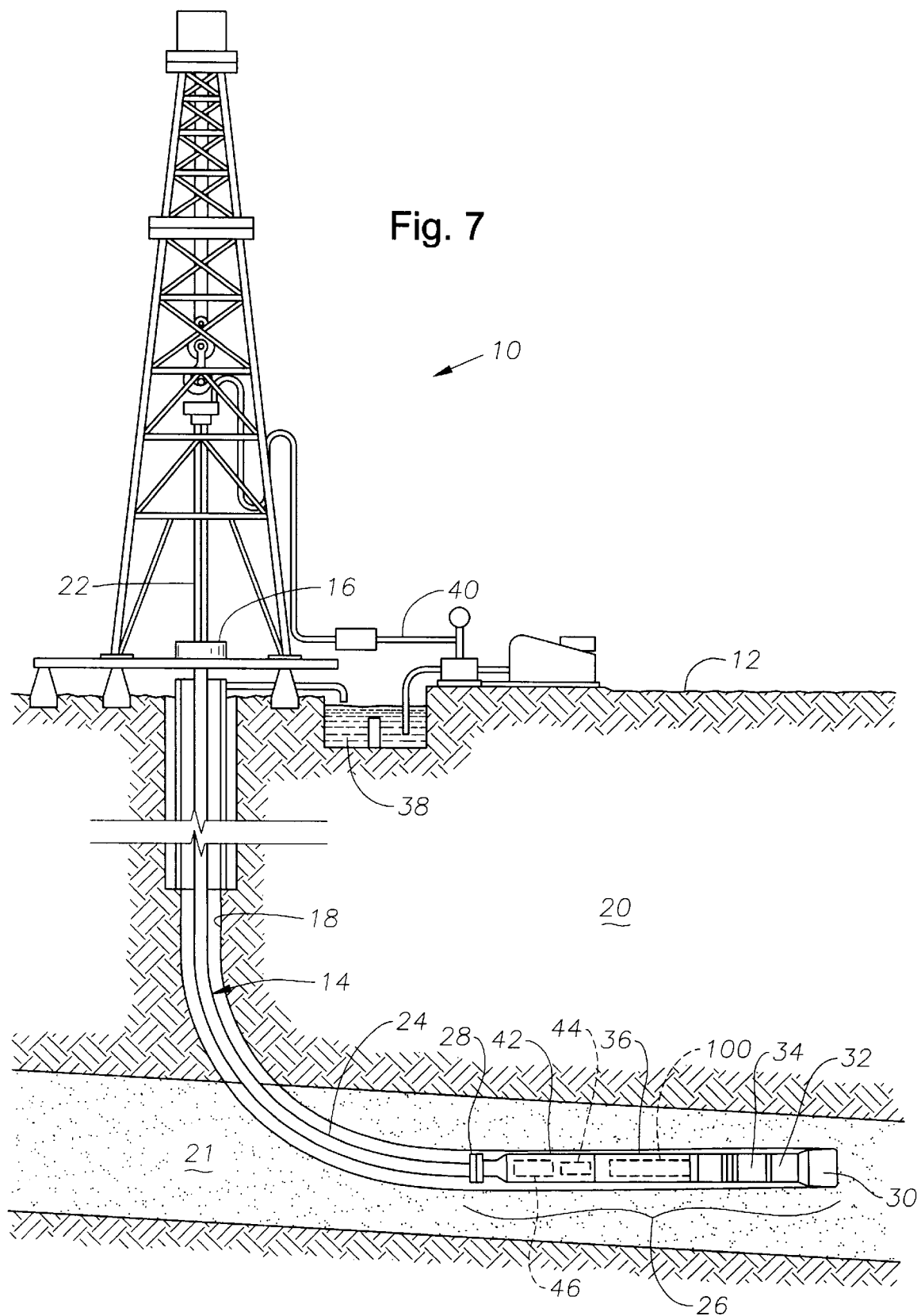
FIG. 7 is an illustration of a wellbore being drilled through subterranean formations in accordance with typical drilling practices.

Referring now to FIG. 7, a drilling installation includes a drilling rig 10 at the surface 12 of a well, supporting a drill string 14. The drill string 14 penetrates through a rotary table 16 and into a borehole 18 that is drilled through earth formations 20 and 21. The drill string 14 includes a kelly 22 at its upper end, drill pipe 24 coupled to the kelly 22, and a bottom hole assembly 26 (commonly referred to as a "BHA") coupled to the lower end of the drill pipe 24 at 28. Alternatively, the drill string may comprise a section of coiled tubing instead of, or in addition to, the drill pipe. The BHA 26 may include a drill bit 30, a downhole motor 32, one or more drill collars 34, a resistivity tool 100 mounted in collar section 36, directional sensors located in a non-magnetic section 42, and one or more stabilizer(s) (not shown) for penetrating through earth formations to create the borehole 18. In operation, the kelly 22, the drill pipe (or coiled tubing) 24 and the BHA 26 are rotated by the rotary table 16. The drill collars 34, which also may be non-magnetic so as not to interfere with the LWD measurements, are used in accordance with conventional techniques to add weight to the drill bit 30 and to stiffen the BHA 26, thereby enabling the BHA 26 to transmit weight to the drill bit 30 without buckling. The weight applied through the drill collars 34 to the bit 30 permits the drill bit to penetrate underground formations.

As the drill bit 30 operates, drilling fluid or mud is pumped from a mud pit 38 at the surface through the kelly hose 40, into the drill pipe (or coiled tubing) 24, to the drill bit 30. After flowing through the drill bit 30, the drilling mud rises back to the surface through the annular area between the drill pipe 24 and the borehole 18, where it is collected and returned to the mud pit 38 for filtering. The drilling mud is used to lubricate the drill bit 30 and to remove cuttings from the borehole 18. The drilling mud may also perform a number of other functions, which could include providing operating power to the downhole motor or other components downhole. As one skilled in the art will realize, the downhole motor or turbine 32 may be used downhole to rotate the drill bit 30 as an alternative, or in addition to, rotating the drill string from the surface. As shown in FIG. 7, BHA 26 typically is defined as all of the downhole components from the top 28 of the drill collars 34, down to the drill bit 30, including downhole motor 32. As one skilled in the art will understand, downhole motor 32 is an optional component, which may be omitted from the BHA 26 if desired.

As is known in the art, the non-magnetic section 42 typically includes directional sensors and drilling parameter sensors such as weight-on-bit (WOB), torque-on-bit (TOB), shock, vibration, etc. In one embodiment, directional sensors are provided in the BHA 26 to provide an indication of inclination angle, the horizontal angle, and the rotational angle (a.k.a. "tool face angle") of the BHA 26. In accordance with known techniques, wellbore directional measurements can be made.

The LWD tool 36 preferably is located close to the drill bit 30 to facilitate the ability to examine the formation as close to the bit as possible. As one skilled in the art will understand, the LWD tool 36 could also be located further up the BHA 26 from the drill bit 30 without departing from the principles of the present invention. Moreover, the LWD tool 36 may in actuality comprise multiple collar sections if necessary to house other LWD sensors. The LWD formation sensors preferably include a resistivity tool 100, which is described in more detail in association with FIG. 8. Other LWD formation sensors also may be provided if desired, including for example gamma, sonic, acoustic, density and neutron sensors. A communications sub, battery pack, or other power source may be included in the LWD tool 36, or alternatively may be positioned in any convenient location to provide power to the various electrical assemblies in the BHA.

Still referring to FIG. 7, a downhole data signaling unit 44 can also be provided as part of BHA 26 and may be used to transmit sensed values to a surface receiver via a mud pulse signal. The drilling mud can serve as a communication medium between the controller and components at the surface of the well. By altering the flow of the drilling mud through the interior of the drill string (or coiled tubing), pressure pulses may be generated in the column of drilling mud. By selectively varying the pressure pulses through the use of a mud pulser in the mud signaling unit 44, encoded binary pressure pulse signals can be generated to carry information indicative of downhole parameters to the surface for immediate analysis. In addition, the downhole system may also include the capability of receiving mud pulse signals from the surface to control the operation or activation of certain LWD sensors or other downhole components. Alternately, a composite drill string having embedded wires could be used to transmit data to the surface, or data could be saved downhole.

A downhole controller 46 may control the operation of signaling unit 44 and orchestrate the operation of the LWD sensors and other BHA components. The controller (or interface module) may be located in sub 42 or elsewhere in the BHA 26. The controller also may make decisions based upon the processed data.

Figure 8:
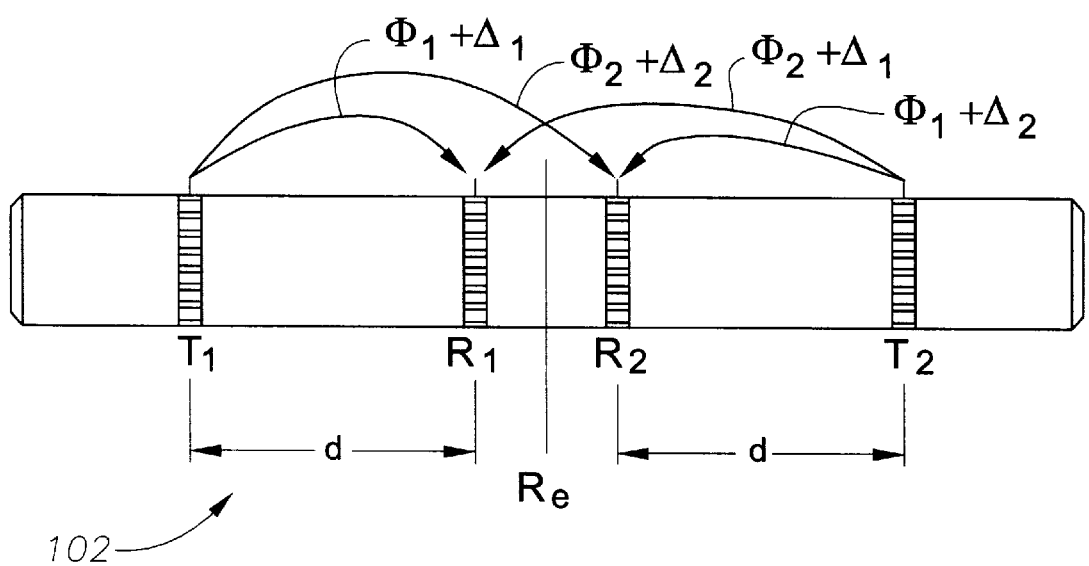
FIG. 8 is a schematic illustration of a simplified single spacing compensated LWD resistivity tool.

One or more stabilizers may be provided as part of the bottom-hole assembly. The stabilizer(s) could include adjustable blades in accordance with the disclosure in commonly assigned U.S. Pat. Nos. 5,318,137 and 5,318,138, the teachings of which are incorporated by reference as if fully set forth herein. As disclosed in these inventions, the inclination of the BHA 26 can be changed by selectively varying the extension of the stabilizer blades. As one skilled in the art will immediately recognize, the course of the BHA 26 also can be changed in accordance with other techniques, such as by selectively turning on or off a downhole motor, adjusting the angle of bend in a bent motor housing, or changing the weight on bit of the system. Use of such an adjustable component downhole in conjunction with an LWD system as disclosed herein makes it possible to design a "Smart System" for drilling certain portions of the wellbore automatically. Alternatively, any other suitable system or assembly may be used for directional drilling without departing from the scope of the teachings herein. For example and as mentioned above, coiled tubing may be used in the drilling system, together with some sort of motor or crawler device. One skilled in the art will understand, therefore, that the LWD system disclosed herein may be used in any drilling system or drilling operation in which it is desirable to detect and locate formations and bed boundaries, regardless of the bottom hole assembly and drill string components that are used. Referring now to FIG. 8, a schematic diagram of a simplified, single-spaced compensated resistivity tool 102 is shown. The resistivity tool 102 includes two transmitters $T_1$, $T_2$, and two receivers $R_1$, $R_2$. Tool 102 is arranged such that $T_1$ and $T_2$ are substantially equally spaced at a distance d from $R_1$ and $R_2$ as shown. When electromagnetic (EM) waves are transmitted from $T_1$ or $T_2$, receivers $R_1$, and $R_2$ detect the signals and measure the amount of phase shift that occurs in the EM wave when it travels through the formation from a transmitter to a receiver. The phase measurements are to have two components, a phase angle $\phi$ determined by the resistivity of the formation in the proximity of the depth of investigation and a phase drift factor A that is a function of the electronics of tool 102 and temperature. Therefore the total phase angle measured by the resistivity tool at each receiver will be $\phi_i + \Delta_j$ wherein the integer "i" corresponds to the range of transmitter spacings and the integer "j" corresponds to the each receiver. As shown in FIG. 8 for example, the total measured phase angle measured between $T_1$ and $R_1$ is $\phi_1 + \Delta_1$. From $T_1$ to $R_2$, the phase angle will likewise be $\phi_2 + \Delta_2$. Since the spacing from transmitter $T_2$ to receiver $R_2$ is the same as from $T_1$ and $R_1$, the total phase angle therebetween would therefore be $\phi_1 + \Delta_2$. The final phase angle measured by schematic resistivity tool 102 would be from $T_2$ to $R_1$ and would be described as $\phi_2 + \Delta_1$.

For a non-compensated resistivity tool (for example, if transmitter $T_2$ were omitted from the schematic tool of FIG. 8), the phase shift would simply be:

$$\text{Total Shift } T_1 = (\phi_2 + \Delta_2) - (\phi_1 + \Delta_1) = (\phi_2 - \phi_1) + (\Delta_2 - \Delta_1)$$

In this example, a thermal drift calibration would have to be performed upon the resistivity tool 102 in order to eliminate or substantially reduce the $\Delta_1$ and $\Delta_2$ factors, thus enabling an accurate measurement of the desired formation phase angle shift $\phi_2 - \phi_1$. This formation phase shift is the information that is used by drilling operators to determine the nature of the formation within which they are drilling.

For the compensated measurements, the (including both transmitters, $T_1$ and $T_2$) the phase shift of $T_2$ is calculated as follows:

$$\text{Total Shift } T_2 = (\phi_2 + \Delta_1) - (\phi_1 + \Delta_2)$$

To achieve the compensated phase shift measurement at the specified depth of investigation, the phase shifts of each transmitter are averaged. This calculation will have the following form:

$$\frac{[(\phi_2 + \Delta_2) - (\phi_1 + \Delta_1)] + [(\phi_2 + \Delta_1) - (\phi_1 + \Delta_2)]}{2}$$

Through distribution, the thermal correction factors $\Delta_j$ are eliminated as the equation reduces to the following:

$$\frac{2\phi_2 - 2\phi_1}{2} = \phi_2 - \phi_1$$

From this simple calculation, it can be seen that a compensated resistivity tool of this type is able to effectively measure the phase shift $\phi_2 - \phi_1$ with little or no concern for the thermal drift correction factors $\Delta_1$ and $\Delta_2$. Without the need for thermal drift compensation factors, $\Delta_j$, resistivity tool 102 can be deployed on a more continuous basis without being required to be returned to the workshop for calibration. Furthermore, the task of returning the resistivity tool 102 to the workshop for a verification calibration following an important drilling job can be eliminated. Unfortunately, tools of this design traditionally require considerably more length (almost double) and many more transmitters (two for each transmitter-receiver spacing) than a corresponding non-compensated tool.

Figure 9A:
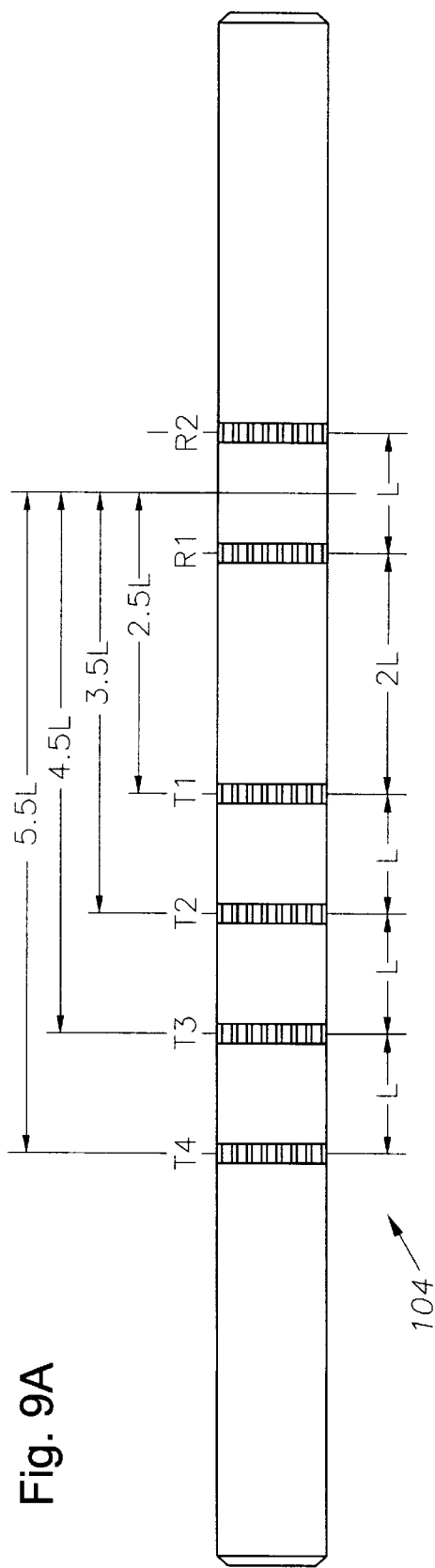
FIG. 9A is a schematic illustration of a non-compensated multiple spacing LWD resistivity tool.
Figure 9B:
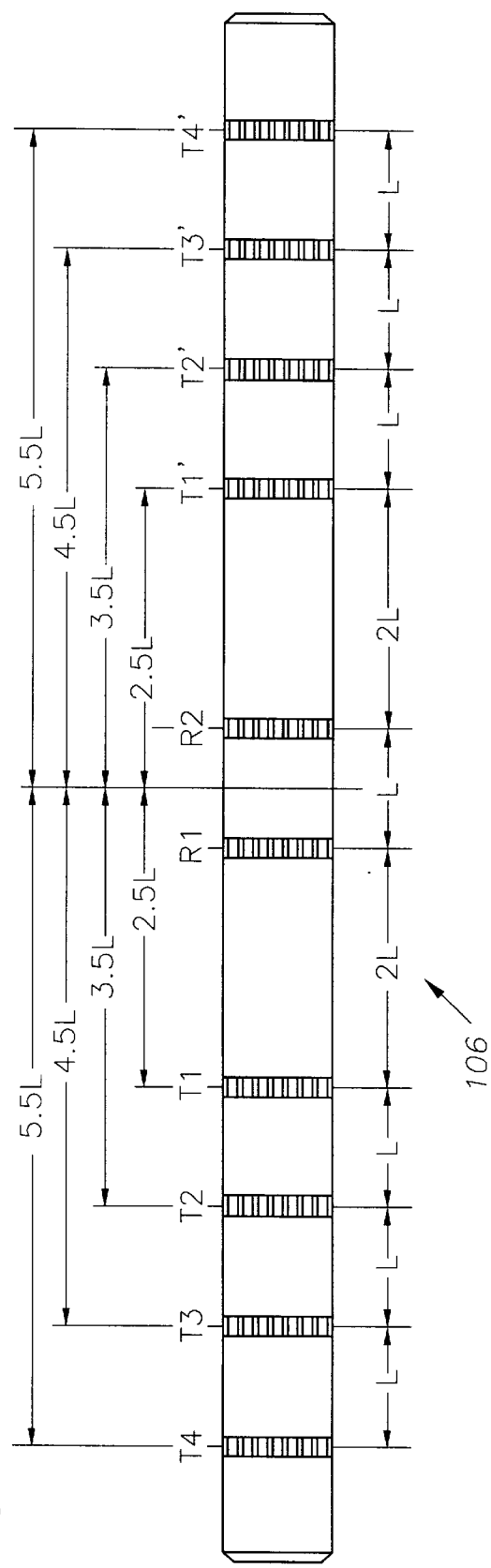
FIG. 9B is a schematic representation of a compensated LWD resistivity tool with equivalent multiple spacings to that of FIG. 9A.

FIGS. 9A–B schematically depict the differences in layout for equivalent four-spacing resistivity tools. FIG. 9A demonstrates a non-compensated tool, while FIG. 9B demonstrates a compensated tool. Referring initially to FIG. 9A, a non-compensated four-spacing tool 104 is shown. Non-compensated tool 104 includes two receivers, $R_1$ and $R_2$, spaced apart by a unit of distance L. Although L is preferably selected as approximately 8 inches, it can be any distance, selected to produce the best measurements in broad assortment of formations encountered. Non-compensated tool 104 also includes four transmitters $T_1$, $T_2$, $T_3$, and $T_4$, with $T_1$ spaced a distance of 2L from receiver $R_1$ and the remaining transmitters spaced apart from each other in succession by L. An effective measuring point $R_E$ is generally midway between receivers $R_1$ and $R_2$ along the length of tool 104. Tool 104, with its four transmitter design, allows for resistivity measurements to be collected relative to $R_E$ at four depths of investigation, corresponding to spacings 2.5L, 3.5L, 4.5L, and 5.5L. The total sensor length of tool 104 is approximately 6L.

The primary concern with tool 104 is that since the measurements are not compensated, thermal correction tables must be generated and verified prior to use downhole. These thermal correction tables are generated by heating tool 104 up to a specified temperature and recording the measured resistivity of a substantially constant formation (often air or water) at specified thermal intervals while tool 104 is allowed to cool. Because tool 104 is usually constructed primarily of a nickel based superalloy and is quite massive, such a cool down test can take several hours. One means to eliminate (or at least reduce) the cool down testing could be to construct a four-spacing resistivity tool in a manner similar to that of FIG. 9B as described below.

Referring now to FIG. 9B, a compensated tool 106 constructed in accordance with the tool 102 of FIG. 8 that maintains the effective transmitter spacings as the non-compensated tool 104 of FIG. 9A is presented. Compensated tool 106 includes a pair of transmitters for each depth of investigation with one transmitter in each pair on opposite sides of receivers $R_1$ and $R_2$. Transmitters $T_1$, $T_2$, $T_3$, and $T_4$ and their corresponding compensating transmitters $T_1'$, $T_2'$, $T_3'$, and $T_4'$ are mounted upon tool 106 as shown. As with non-compensated tool 104 of FIG. 9A, an effective measuring point $R_E$ is located midway between receivers $R_1$ and $R_2$ along the length of tool 106. Compensated tool 106 allows for compensated measurements at the same four spacings (2.5L, 3.5L, 4.5L, and 5.5L) relative to $R_E$ as non-compensated tool 104 of FIG. 9A. A benefit of compensated tool 106 is that resistivity measurements can be made without the time-consuming task of making thermal compensation tables. A drawback to compensated tool 104 of FIG. 9A is that the tool has an effective length of 11L (vs. 6L for the non-compensated tool) and requires the installation of 8 transmitters (vs. 4 for the non-compensated tool). The longer effective length is less desirable to drilling operators because it moves the effective resistivity measurement farther behind the drill bit. Drilling operators prefer that the LWD resistivity measurement take place as close to the bit as possible.

Furthermore the addition of the extra transmitters is undesirable because it adds to the costs and weakens the structural integrity of resistivity tool 106. Drilling collars, like those used to house LWD tools, are subjected to extreme thermal and physical stress loads. Because the removal, or "fishing," of a broken or damaged collar is very time consuming and therefore expensive, drilling operators will always favor LWD tools that are housed within an inherently stronger collars. The more surface features that are machined along the length of drilling collars, the weaker the overall and fatigue strength becomes. Therefore, a compensated resistivity tool that provides the same types and number of measurements but requires fewer transmitters and receivers than that of FIG. 9B would be highly desirable to those in the industry.

Referring now to FIGS. 10A–B, a multi-mode resistivity tool 110 in accordance with a preferred embodiment of the present invention is shown. Multi-mode resistivity tool 110 preferably includes a group 112 of three receivers $R_1$, $R_2$, and $R_3$ and an array of five transmitters, $T_1$, $T_2$, $T_3$, $T_4$, and $T_5$ mounted asymmetrically outside the receiver group 112. Although the spacings, locations, and numbers of the transmitters and receivers are infinitely variable, the following geometry is selected so that multi-mode tool 110 can produce compensated measurements at the same transmitter-receiver spacings (2.5L, 3.5L, 4.5L, and 5.5L) as tools 104 and 106 of FIGS. 9A and 9B respectively. Receivers $R_1$, $R_2$, and $R_3$ are centralized along the length of tool 110 as shown, spaced equally apart by the same distance L as shown in FIGS. 9A–B. Transmitter $T_1$ is located uphole of the receiver group 112 by the same distance L with transmitters $T_2$ and $T_3$, following in series at spacings of 2L. Transmitter $T_4$ is located downhole of receiver group 112 at a distance of 2L with transmitter $T_5$ following a distance of 2L thereafter.

Because LWD resistivity measurements are taken by a pair of receivers at any given time, the effective measurements are taken at locations substantially midway along the length of tool 110 between two adjacent receivers. Referring to FIG. 10A, the effective measurements for resistivity tool 110 in phase difference and attenuation taken from receivers $R_1$ and $R_2$ are at location $R_{E1}$ and the effective measurements taken from receivers $R_2$ and $R_3$ are at location $R_{E2}$. Because $R_{E1}$ is midway between receivers $R_1$ and $R_2$, and $R_{E2}$ is midway between $R_2$ and $R_3$, any measurement taken from any transmitter to a pair $R_1$ and $R_2$ or $R_2$ and $R_3$ is effectively taken a distance of ½L from either receiver. Referring specifically to now FIG. 10A, it can be shown that compensated resistivity measurements can be collected at the following transmitter-receiver spacings according to the following table:

$T_1 \rightarrow R_{E2} = 2.5L = T_4 \rightarrow R_{E2}$ $T_2 \rightarrow R_{E1} = 3.5L = T_4 \rightarrow R_{E1}$ $T_2 \rightarrow R_{E2} = 4.5L = T_5 \rightarrow R_{E2}$ $T_3 \rightarrow R_{E1} = 5.5L = T_5 \rightarrow R_{E1}$ These measurements are of the same depths of investigation and compensation scheme as the fully compensated tool of FIG. 9B but with fewer transmitters. By adding an additional receiver and skewing the array of transmitters on one side of transmitter group 112, fully compensated measurements can be performed at four depths of investigation with a tool that only requires 8 antennas, 2 fewer than the number required by the fully compensated tool 106 of FIG. 9B.

Referring now to FIG. 10B, it can also be shown that the following non-compensated measurements can also be measured by resistivity tool 110:

$T_1 \rightarrow R_{E1} = 1.5L$ $T_3 \rightarrow R_{E2} = 6.5L$

Although these transmitter spacings cannot be compensated under the current geometry of tool 110 they may provide additional data points that can assist drilling operators in their endeavors. For tool 110 to measure formation resistivity accurately at the 1.5L and 6.5L spacings, a temperature coefficient lookup table must be constructed as described above in reference to tool 104 of FIG. 9A.

Figure 11:
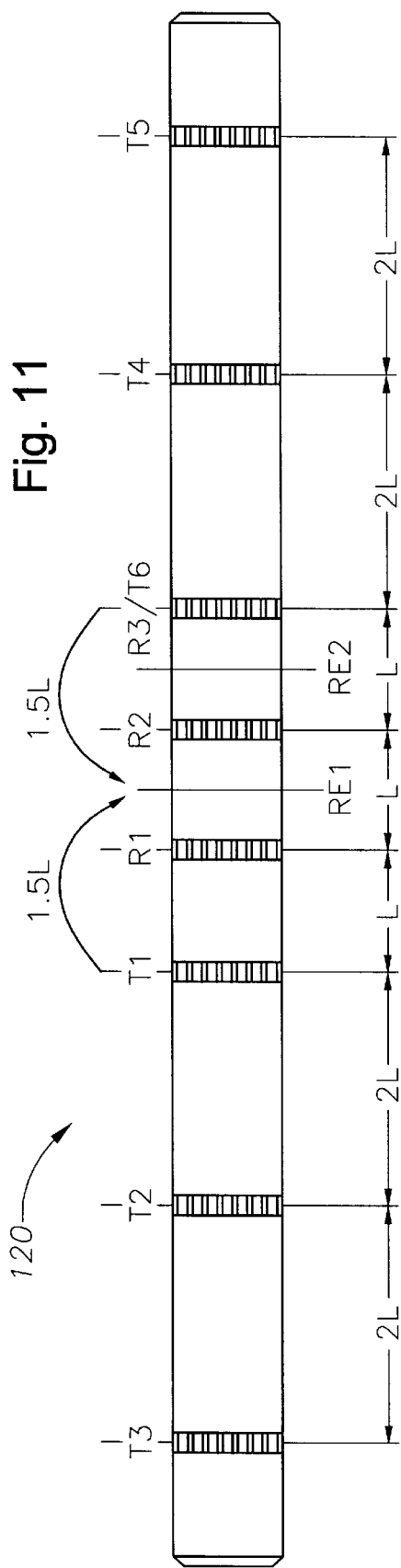
FIG. 11 is a schematic illustration of a multi-mode LWD resistivity tool constructed in accordance with a second preferred embodiment of the present invention that details an additional compensated measurement.

Referring now to FIG. 11, an alternative resistivity tool 120 is shown wherein Receiver $R_3$ can also function as a transmitter, $T_6$, thus acting as a transceiver $R_3/T_6$. The change from the transmitter to the receiver function of $R_3/T_6$ would most likely be dictated by the software and or electronics and would not interfere with the collection of data at the transmitter spacings (2.5L, 3.5L, 4.5L, and 5.5L) of FIG. 10A. In this alternative embodiment, the 1.5L spacing referred to above in reference to FIG. 10B can now be fully compensated, leaving only the 6.5L depth of investigation uncompensated in the three receiver tool 120.

Figure 12:
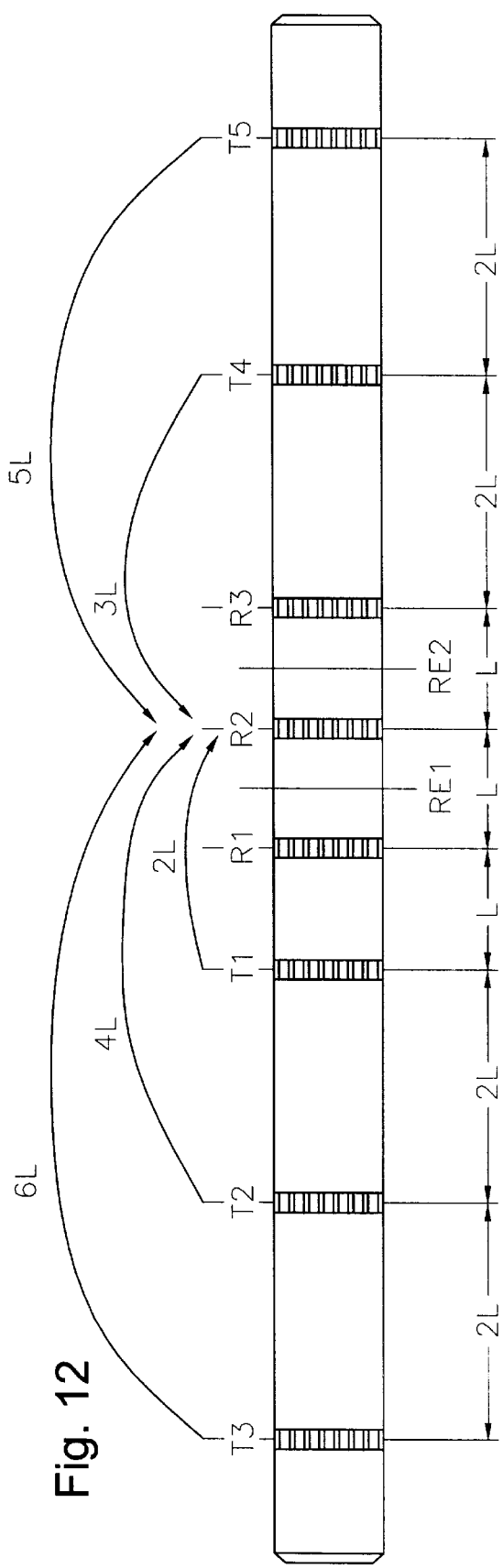
FIG. 12 is a schematic illustration of the resistivity tool of FIG. 10 functioning in a two receiver mode detailing non-compensated measurements.

Referring now to FIG. 12 the multi-mode resistivity tool 110 of FIGS. 10A–B is shown schematically whilst in a non-compensated or pseudo-compensated mode. By eliminating receiver $R_2$ from consideration and collecting data using $R_1$ and $R_3$ as a receiver pair, the spacing between the two activated receivers is now 2L with the effective point of measure occurring at the inactive receiver $R_2$. Using this new spacing, the following non-compensated depths of investigation can be measured:

$T_1 \rightarrow R_2 = 2L$ $T_4 \rightarrow R_2 = 3L$ $T_2 \rightarrow R_2 = 4L$ $T_5 \rightarrow R_2 = 5L$ $T_3 \rightarrow R_2 = 6L$ Although this configuration will not produce compensated results, the wider spacing between the receiver pair has been proven to be more beneficial in certain types of formation and under some drilling conditions. Particularly, this configuration will allow more accurate measurements when operated at low EM frequencies since the 2L separation will yield more phase shift and attenuation. Although multi-mode tool 110 must be fully calibrated at temperature prior to such a LWD run, the ability to run a single resistivity tool 110 in a wide assortment of configurations is highly desirable. Such a multi-mode tool could even be configured to operate at all modes during a trip downhole, collecting compensated and non-compensated data at alternating depths or even simultaneously. Under such circumstances, depths of investigation at 4 compensated and 7 non-compensated transmitter-receiver spacings could be measured with tool 110 of FIGS. 10A–B and 12. Alternatively, tool 120 of FIG. 11 with the combination transceiver $R_3/T_6$ were adopted, 5 compensated and 6 non-compensated spacings could be investigated.

Alternatively still, whilst operating in non-compensated mode, resistivity tool 100 can be configured such that Receiver $R_2$ is not eliminated but is instead configured to operate as a transmitter in a similar manner to transceiver $R_3/T_6$ of tool 120 of FIG. 11. This would enable the convertible receiver $R_2$ to function as a calibration transmitter and make temperature drift corrections. An example of a resistivity tool with a calibration transmitter located between a pair of receivers can be found in U.S. patent application Ser. No. 09/368,471, filed Aug. 4, 1999, titled "Multi-Frequency Electromagnetic Wave Resistivity Tool With Improved Calibration Measurement," by Bittar et al. hereby incorporated herein by reference.

The multi-mode tool 110 of the preferred embodiment of the present invention is desirable because it offers the functionality of at least two different modes of operation, a fully compensated, and a non-compensated with alternative receiver spacings, from the same tool. Operators that choose to deploy multi-mode tool 110 would be able to offer a wide assortment of LWD resistivity services with a single tool, enabling them to more thoroughly investigate well formations during drilling operations that previously possible.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What claimed is:

1. A logging tool to make resistivity measurements of a drilled formation, the tool having an upstream direction and a downstream direction along its length, the logging tool comprising:

an array of receivers, said array including least three receiver antennas;

a first pair of receivers selected from the array, said first pair of receivers defining a first midpoint therebetween;

a second pair of receivers selected from the array, said second pair of receivers defining a second midpoint therebetween;

said first pair of receivers positioned upstream of said second pair of receivers;

a plurality of transmitters, said transmitters configured to transmit electromagnetic waves into the formation;

said first and said second receiver pairs configured to receive said electromagnetic waves;

a first transmitter and a second transmitter, said first transmitter located upstream of said receiver array, and said second transmitter positioned downstream of said receiver array;

said first transmitter and said second transmitter located substantially equidistant from said first midpoint;

a third transmitter located downstream of said second transmitter along the length of the tool; and said third transmitter and said first transmitter located substantially equidistant from said second midpoint.

2. The logging tool of claim 1 wherein said first and said second pairs of receivers share a common receiver.

3. The logging tool of claim 1 wherein said plurality of transmitters are configured to generate electromagnetic waves of at least two different frequencies.

4. The logging tool of claim 1 wherein one of said three receivers is midway between the other two.

5. The logging tool of claim 4 wherein no selected pair of said transmitters is equidistant from said one of three receivers.

6. A logging tool that comprises:

an array of at least three receiver antennas; and an array of at least N transmitter antennas, wherein N is greater than two, and wherein the transmitter antennas are arranged around the array of receiver antennas to provide fully compensated resistivity measurements at N−1 different transmitter to receiver-pair-midpoint distances.

7. The logging tool of claim 6, wherein the three receiver antennas are equally-spaced along a tool axis.

8. The logging tool of claim 6, wherein adjacent transmitter antennas are spaced apart by a distance substantially equal to a length of the array of receiver antennas.

9. The logging tool of claim 6, wherein N is greater than three.

10. The logging tool of claim 6, wherein N is greater than four.

11. The logging tool of claim 6, wherein said transmitter antennas are configured to sequentially transmit electromagnetic wave signals into an earth formation around a borehole.

12. The logging tool of claim 6, wherein at least one of said receivers is configured to transmit electromagnetic wave signals.

13. The logging tool of claim 6, wherein said array of transmitter antennas are configured to generate electromagnetic waves of at least two different frequencies.

* * * * *